United States Patent [19]

Morin et al.

[11] Patent Number: 5,238,861
[45] Date of Patent: Aug. 24, 1993

[54] METHOD FOR MANUFACTURING AN ACTIVE MATRIX DISPLAY SCREEN WITH STORAGE CAPACITORS

[75] Inventors: François Morin; Michel Le Contellec, both of Lannion, France

[73] Assignee: France Telecom Etablissement Autonome de Droit Public(Centre National d'Etudes des Telecommunications), Issy les Moulineaux, France

[21] Appl. No.: 699,600

[22] Filed: May 14, 1991

[30] Foreign Application Priority Data

May 15, 1990 [FR] France ............................. 90 06042

[51] Int. Cl.$^5$ .............................. H01L 21/70
[52] U.S. Cl. ................................ 437/51; 437/181; 437/919; 148/DIG. 14
[58] Field of Search ................... 437/51, 181, 60, 913, 437/48; 148/DIG. 14; 359/84, 87

[56] References Cited

U.S. PATENT DOCUMENTS

| | | | |
|---|---|---|---|
| 4,738,749 | 4/1988 | Maurice et al. | 437/181 |
| 4,762,398 | 8/1988 | Yasui et al. | 359/87 |
| 4,778,560 | 10/1988 | Takeda et al. | 437/181 |
| 4,790,630 | 12/1988 | Maurice | 437/181 |
| 4,792,210 | 12/1988 | Maurice | 437/181 |
| 4,836,650 | 6/1989 | Morin et al. | 437/181 |
| 4,907,861 | 3/1990 | Muto | 357/4 |
| 5,028,122 | 7/1991 | Hamada et al. | 359/59 |
| 5,032,536 | 7/1991 | Oritsuki et al. | 437/181 |
| 5,054,887 | 10/1991 | Kato et al. | 359/59 |
| 5,087,113 | 2/1992 | Sakono et al. | 359/59 |
| 5,162,901 | 11/1992 | Shimada et al. | 359/87 |

FOREIGN PATENT DOCUMENTS

| | | | |
|---|---|---|---|
| 0103523 | 3/1984 | European Pat. Off. | |
| 59-119322 | 11/1984 | Japan . | |
| 1277217 | 7/1989 | Japan . | |
| 1267617 | 10/1989 | Japan | 437/51 |
| 0008819 | 1/1990 | Japan | 437/51 |

OTHER PUBLICATIONS

"A 6.7-In. Square High-Resolution Full-Color TFT-LCD", Japan Display'89, pp. 514-517, Y. Asai et al (date unknown).

Primary Examiner—Brian E. Hearn
Assistant Examiner—Michael Trinh
Attorney, Agent, or Firm—Oblon, Spivak, McClelland, Maier & Neustadt

[57] ABSTRACT

The method includes only two masking levels. During the second masking, capacitative lines (LC) (dedicated or merged with the addressing lines) are defined which overlap the pixels so as to form the storage capacitors (Cs).

Application for display on flat liquid crystal screens.

8 Claims, 6 Drawing Sheets

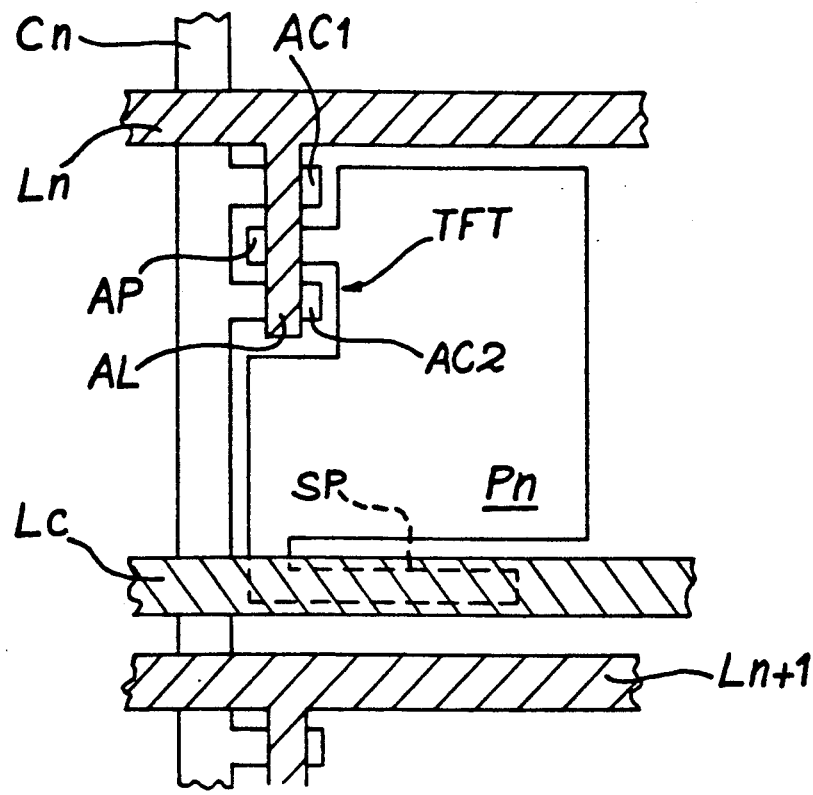
FIG. 7
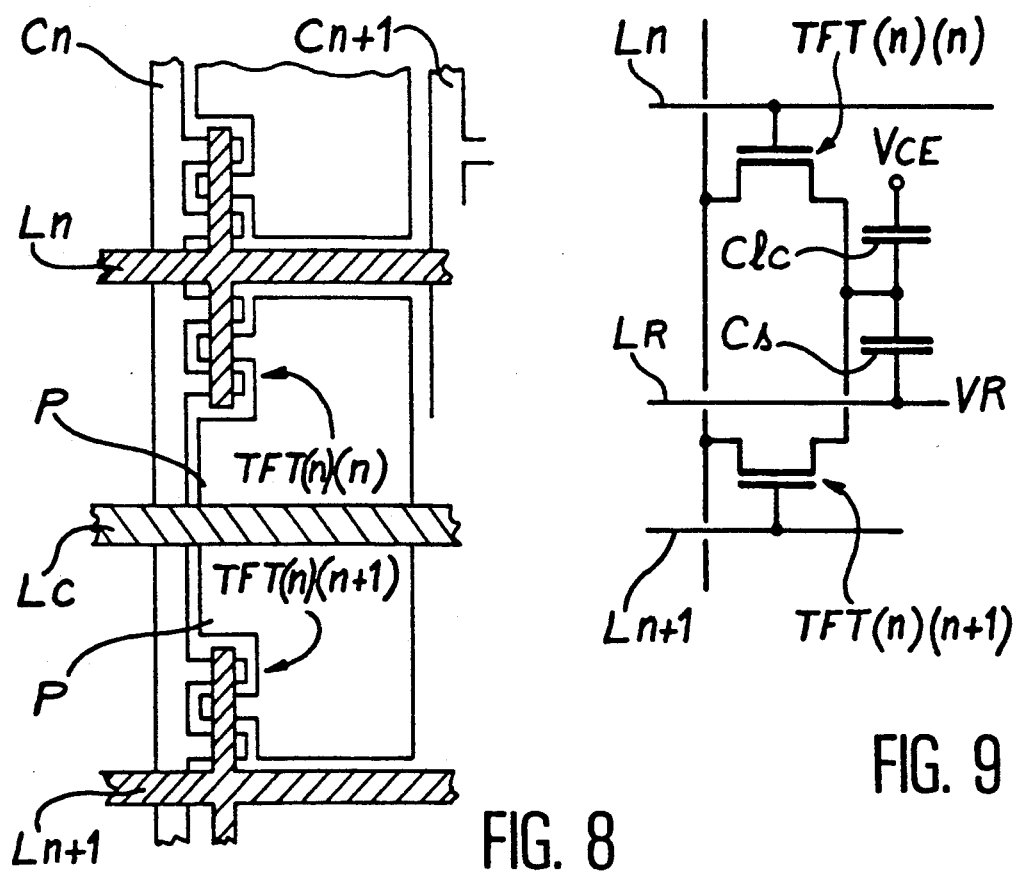
FIG. 8
FIG. 9

METHOD FOR MANUFACTURING AN ACTIVE MATRIX DISPLAY SCREEN WITH STORAGE CAPACITORS

FIELD OF THE INVENTION

The present invention concerns a method for embodying an active matrix display screen with storage capacitors and a screen obtained by this method.

BACKGROUND OF THE INVENTION

An active matrix display screen is diagrammatically constituted by two plates, the first being covered with a matrix of conductive blocks defining pixels, each block being associated with an addressing transistor controlled by addressing columns and lines, and the second plate being covered by a counter-electrode. A liquid crystal is inserted between the two plates.

Recently, active matrix display screens have appeared also including storage capacitors. The advantage of these capacitors is to limit temperature rise which, as regards a conventional screen, decreases the time constant of the capacity of the pixel, the liquid crystal and the control transistor becoming the center of leakage currents.

An example of active matrix display screens with storage capacitors is described in the document GB-A-2 115 199 in the article by D. TOMITA et al and entitled "A 6.5-in Diagonal TFT-LCD Module for Liquid Crystal TV" appearing in the journal SID 89 DIGEST, pp. 151-154, as well as in the article by Y. ASAI and entitled "A 6.7-in Square High-Resolution Full-Color TFL-LCD" appearing in the journal Japan Display 89, pp. 514-517.

FIGS. 1a and 1b and secondly 2a and 2b diagrammatically illustrate this prior art.

FIG. 1a shows a cell including a TFT transistor (this designation generally concerning a thin filmed transistor), and a Clc capacitor corresponding to the liquid crystal inserted between the armature of the first plate and the counter-electrode raised to a VCE potential. The addressing line controlling the grid of the TFT is given the reference L and the addressing column the reference C.

The cell of FIG. 1b differs from FIG. 1a by virtue of the presence of a storage capacitor Cs, one of its armatures being connected to the TFT and the other to a reference potential VR.

FIGS. 2a and 2b show two ways for controlling a screen with storage capacitors. In FIG. 2a, the storage capacitors corresponding to a given line Ln have one of their armatures connected to a dedicated electrode LC specially embodied for this purpose, all the lines LC being joined to a reference strip LR disposed on the side of the screen and brought to a potential VR. In FIG. 2b, the storage capacitors Cs belonging to a line Ln+1 have an armature connected to the preceding line Ln.

In the first case, the reference potential VR may be the potential of the counter-electrode. In the second, the reference potential is that of the preceding line. This potential is well-established and thus may serve as a reference during the frame time, except during the addressing time where its value is disturbed. As this disturbance occurs immediately before cooling of the line in question, it has no effect on the final potential of the pixel.

A large number of methods are possible for embodying such structures.

When it concerns conventional display screen without storage capacitors, the method is simpler than the one described in the document FR-A-2 533 072. This method, known as the "two level masking method", mainly includes the following operations:

preparation of a glass substrate by means of physico-chemical cleaning, depositing a film of a transparent conductive material, such as tin and indium oxide (ITO), first photoetching so as to give the transparent conductive film the shape of columns and blocks extended by a lengthening piece, depositing a stacking formed of a semiconductive film, a nonconducting film and a metallic film, second photoetching applied to the preceding stacking so as to define lines overlapping the lengthening pieces of the blocks and crossing the columns, this photoetching defining thin film transistors.

When it comes to embodying a screen with storage capacitors, this presents a special difficulty due to the embodiment of the armatures of the capacitors.

Known methods of embodiment require at least two masking levels and sometimes six. For example, in the technique described in the article by O. TOMITA et al mentioned earlier, a film of Mo-Ta is firstly deposited on a glass substrate and is subjected to a first photoetching so as to constitute the grids of the future transistors and one of the armatures of the storage capacitors. The unit is covered with a nonconductor. Then a film of ITO is deposited and a second photoetching is made so as to constitute the second armatures of the storage capacitors. Then a semiconductor (a-Si) is deposited and then this semiconductor is only allowed to be situated above the grids. Conductive films (a-Si n+, Mo/Al) are then deposited and etched during a fourth operation for masking and etching.

SUMMARY OF THE INVENTION

The object of the present invention is to reduce this complexity and seeks more particularly to rediscover the simplicity of the two level masking method.

This objective is attained via a method which makes use of some of the operations of the two level masking method described in the document FR-A-2 533 072 and which is characterized by the fact that, during the second photoetching, capacitive lines are allowed to exist disposed parallel to the addressing lines and overlapping one portion of the blocks, each capacitive line forming, along with the portion of the block it overlaps, the storage capacitor associated with this block.

In one first variant, the method is characterized by the fact that the capacitive lines are lines dedicated to this function and are all connected to a strip situated on the side of the screen.

In a second variant, the method is characterizsed by the fact that, during the second photoetching, the capactive lines are merged with the addressing lines and firstly overlap segments extending the blocks so as to form the storage capacitors, and secondly overlap the various column or block lengthening pieces so as to form the addressing transistors.

The object of the present invention is also to provide a display screen obtained by the method described above. This screen is of the type of the one described in the document FR-A-2 533 072 and is characterized by the fact that it further includes capacitive lines formed of the stacking of films, these lines overlapping one portion of the blocks and forming storage capacitors connected to the blocks.

In one first embodiment, the capacitive lines are lines especially added so as to produce an additional capacitor.

In a second embodiment, the capacitive lines are merged in the addressing lines and overlap firstly segments of the blocks so as to form the storage capacitors and secondly the various column and block lengthening pieces so as to form the addressing transistors.

BRIEF DESCRIPTION OF THE DRAWINGS

The characteristics and advantages of the invention shall appear more readily from a reading of the following description relating to embodiment examples, given by way of explanation and being non-restrictive, with reference to the accompanying drawings in which:

FIG. 7 shows a top view of a fourth embodiment;

FIG. 8 shows a top view of a fifth embodiment;

FIG. 9 shows the equivalent circuit diagram of a screen according to FIG. 8;

DETAILED DESCRIPTION OF THE PREFERRED EMBODIMENTS

Figure 1:
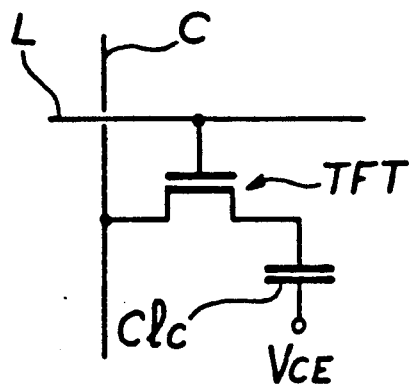
FIGS. 1a and 1b, already described, show the general structure of the screens with or without storage capacitors.
Figure 1:
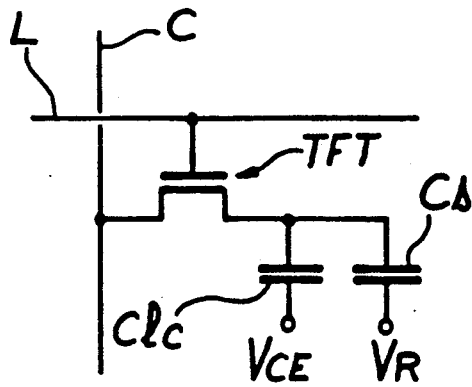
Figure 2:
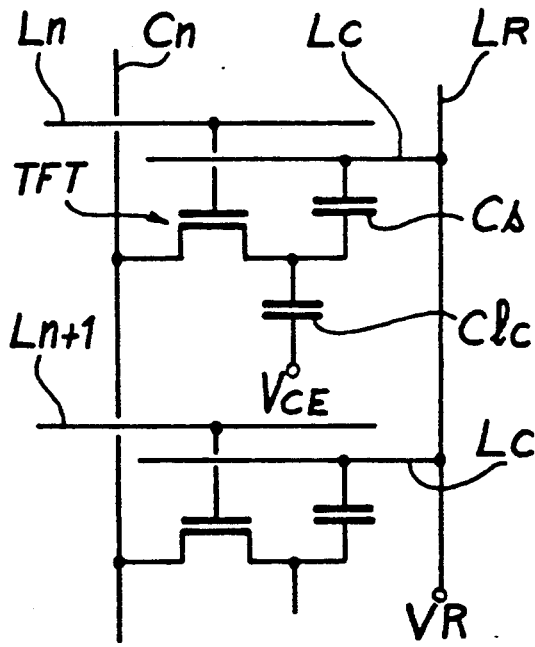
FIGS. 2a and 2b, already described, show two control means for storage capacitor screens.
Figure 2:
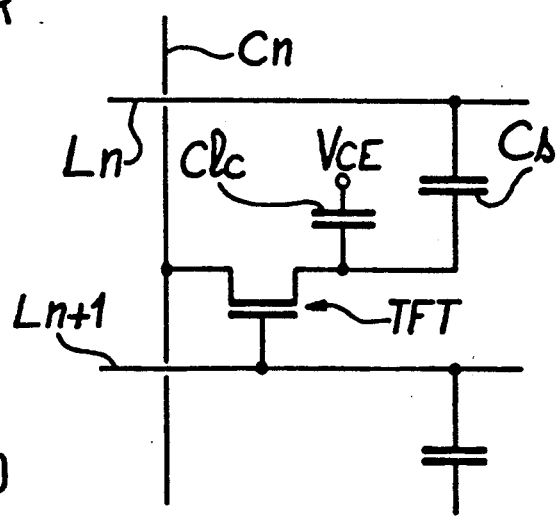
Figure 3:
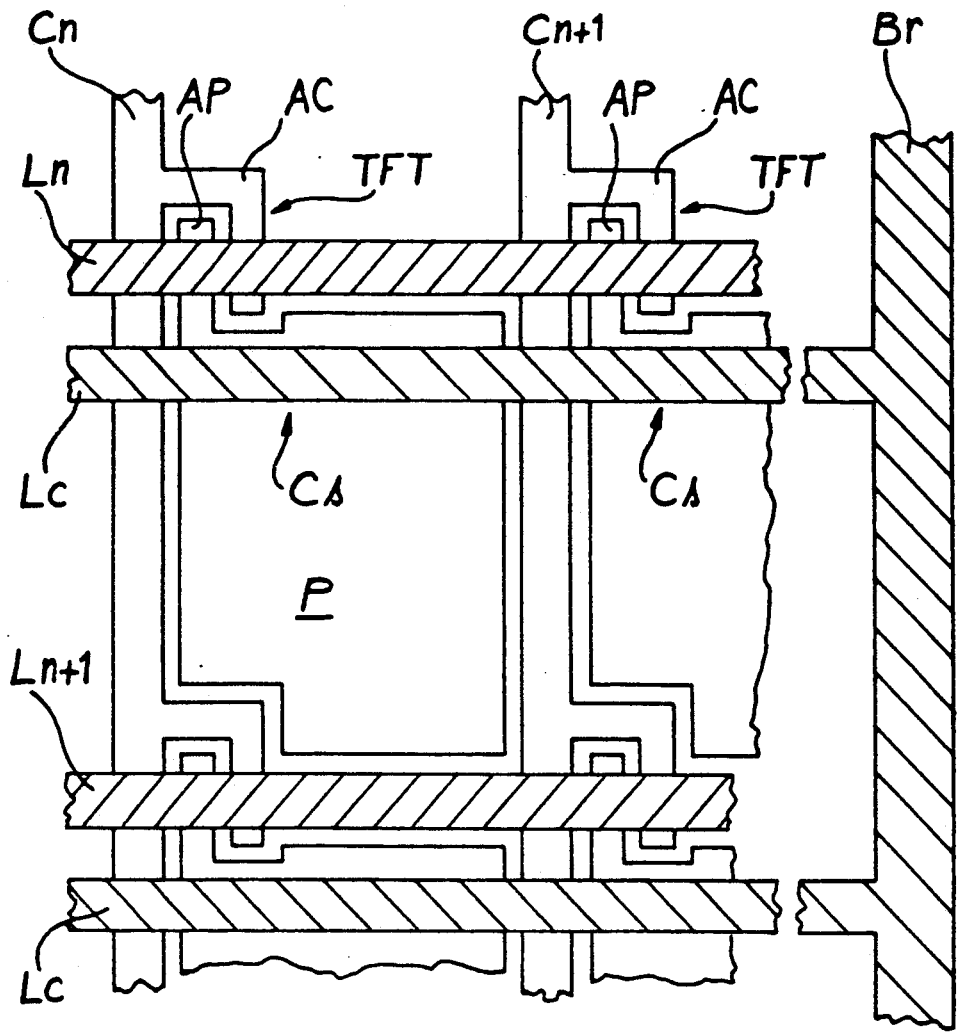
FIG. 3 shows a top view of a screen conforming to the invention in a first embodiment with a dedicated electrode.
Figure 4A:
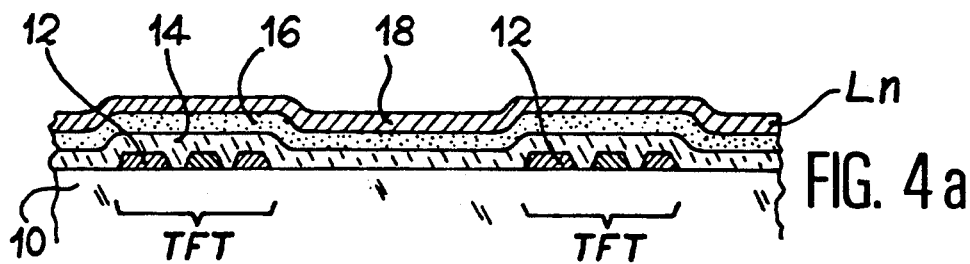
FIGS. 4a and 4b show two sections of the screen of FIG. 3.
Figure 4B:
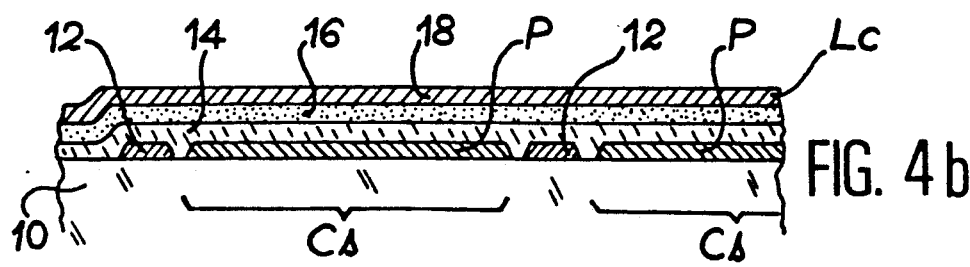

FIGS. 3, 4a and 4b show a display screen obtained according to a mode for implementing the method of the invention. A film of a transparent conductive material 12, such as indium-tin oxide ITO, is deposited on a glass plate 10. By means of a first photoetching through a first masking level, patterns are obtained constituted by columns Cn, Cn+1, etc., and blocks P. These patterns correspond to the non-hatched zones of FIG. 3. Each block P is extended by a lengthening piece, known as a block lengthening piece AP. In the variant illustrated, each column is extended by a bent lengthening piece known as a column lengthening piece AC. The block lengthening piece AP is inserted between the column and the bent column lengthening piece AC. This disposition is intended to obtain a double control transistor, but is not obligatory.

This is followed by the depositing of a stack of a semiconductive film 14, such as a silicon film, a nonconducting film, such as a film of silicon nitride, and a metallic film 18, such as an aluminium film.

In a second photoetching, patterns are defined through a second masking level, such as the patterns hatched on FIG. 3, namely the addressing lines Ln, Ln+1, etc, the capacitive lines LC and a reference strip Br on the side of the screen.

The addressing lines Ln and Ln+1 define the TFTs (double in the variant shown) and the lines LC, along with the conductive film of the block P they cover, define the sought-after storage capacitors Cs.

FIG. 4a corresponds to a section along an addressing line, such as Ln, and reveals the double addressing transistors, whereas FIG. 4b shows a section along a capacitive line LC and reveals the storage capacitor between LC and P.

Figure 5:
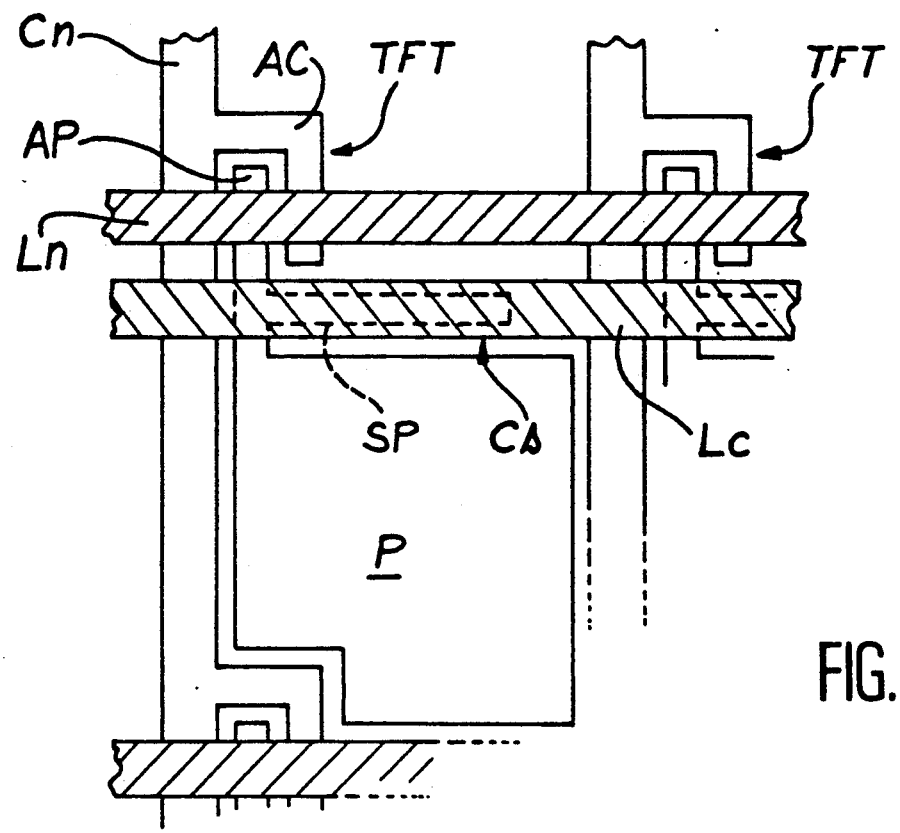
FIG. 5 shows a top view of a second embodiment.

In the variant of FIG. 5, this figure features the same elements as those appearing in FIG. 3 and has the same references with the slight exception that, during the first etching, the blocks P are formed being extended by a segment SP, the capacitive lines embodied during the second etching overlapping these segments so as to form, along with these segments, the desired capacitors.

Figure 6:
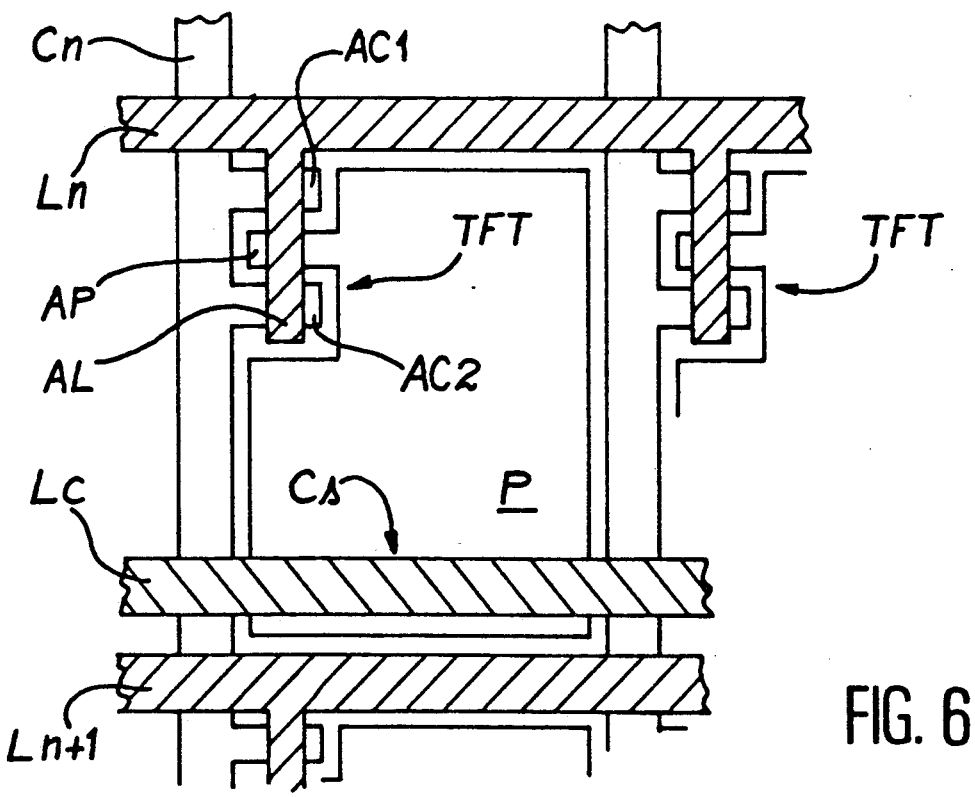
FIG. 6 shows a top view of a third embodiment.

The screen shown in FIG. 6 differs from that of FIG. 3 by the fact that, during the first etching, each column is extended by two column lengthening pieces AC1 and AC2 at the level of each block which includes a lengthening piece AP to be inserted between the column lengthening pieces, and by the fact that, during the second etching, each line is extended at the level of each block by a line lengthening piece AL which overlaps the column lengthening pieces AC1, AC2 and the block lengthening piece AP.

In addition, the capacitive line LC is still disposed across the block P so as to form the storage capacitor Cs.

FIG. 7 shows one variant which combines the disposition of FIG. 5 where each block is extended by a segment SP and that of FIG. 6 where the block lengthening piece AP is inserted between two column lengthening pieces AC1, AC2.

FIGS. 8 and 9 show one case where each block P is controlled by two addressing transistors so as to obtain a certain redundancy. One of the transistors TFT(n)(n) corresponds to the line Ln and to the column Cn, the other, TFT(n+1)(n), corresponds to the line Ln+1 and to the same column Cn. In this case, the capacitive line LC overlaps the block P in its median portion between the two successive addressing lines Ln, Ln+1.

FIG. 9 shows the corresponding circuit diagram.

Figure 10:
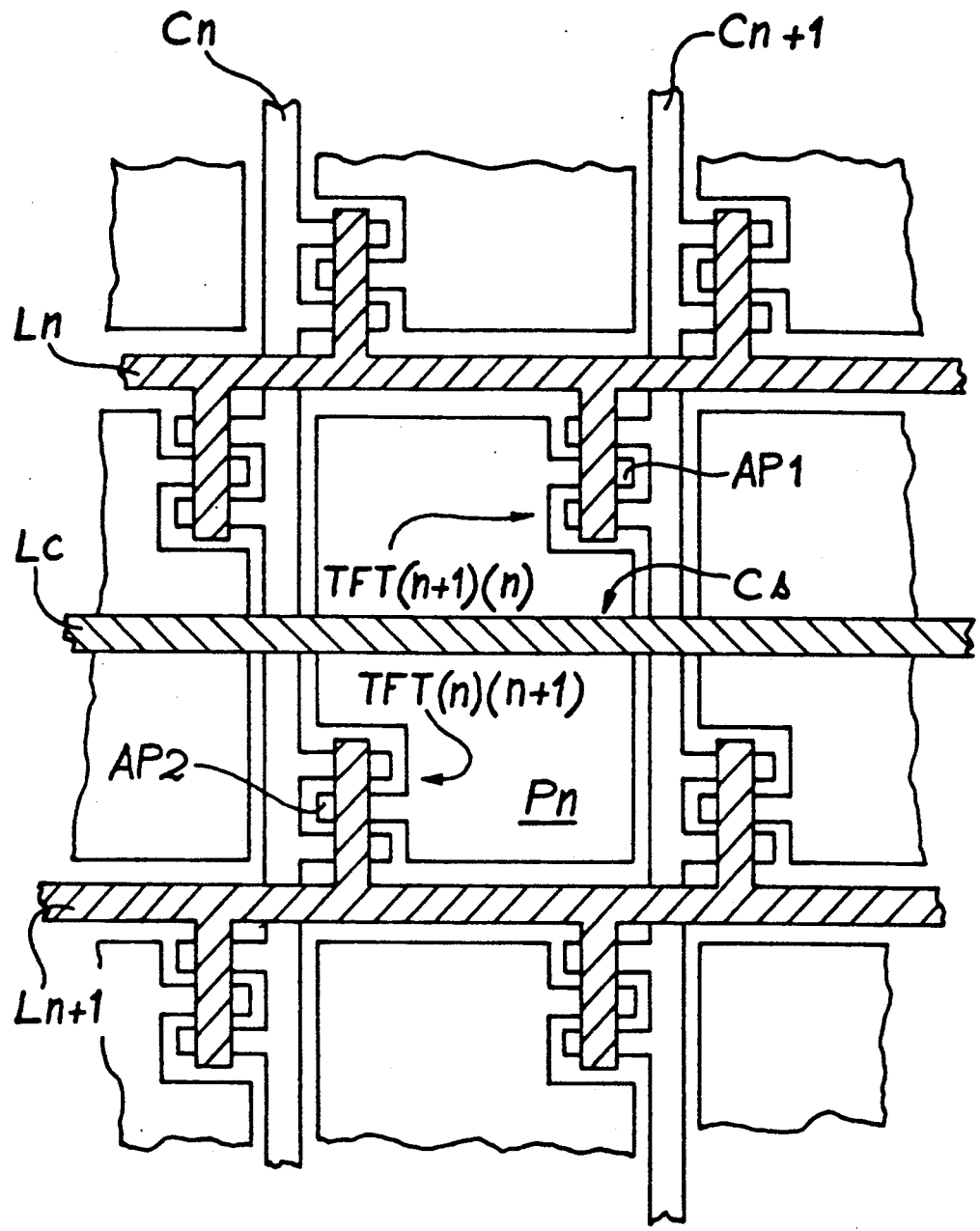
FIG. 10 shows a top view of a sixth embodiment.

The variant shown in FIG. 10 corresponds to the case where each block includes two diagonally opposing lengthening pieces AP1, AP2 engaged between two column lengthening pieces respectively corresponding to the column Cn+1 and the column Cn. One block Pn defined by a line Ln and one column Cn is thus controlled redundantly by two double transistors, respectively TFT(n+1)(n) and TFT(n)(n+1). In the event of cutting off of the column Cn, the pixel is fed by the column Cn+1.

In this variant, the capacitive line covers the blocks in their median zone.

Figure 11:
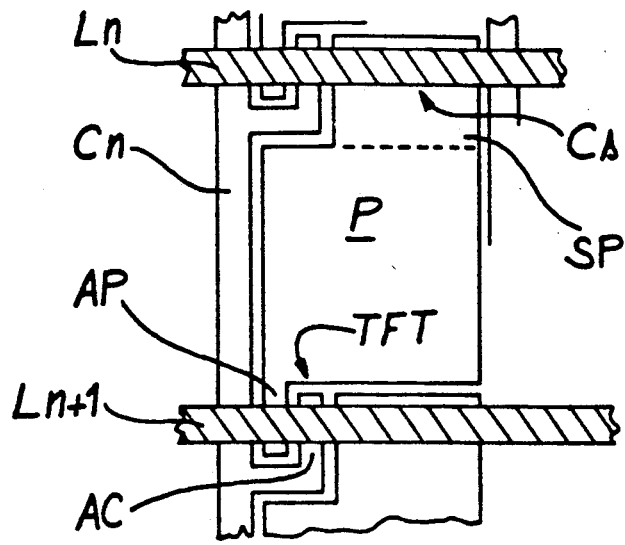
FIG. 11 shows a screen in which the storage capacitor is controlled by the preceding line.
Figure 12:
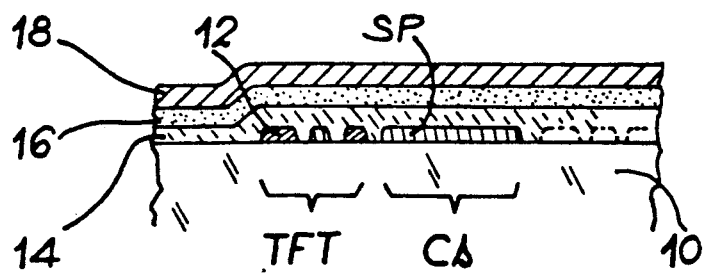
FIG. 12 shows a section of the screen of FIG. 11.
Figure 13:
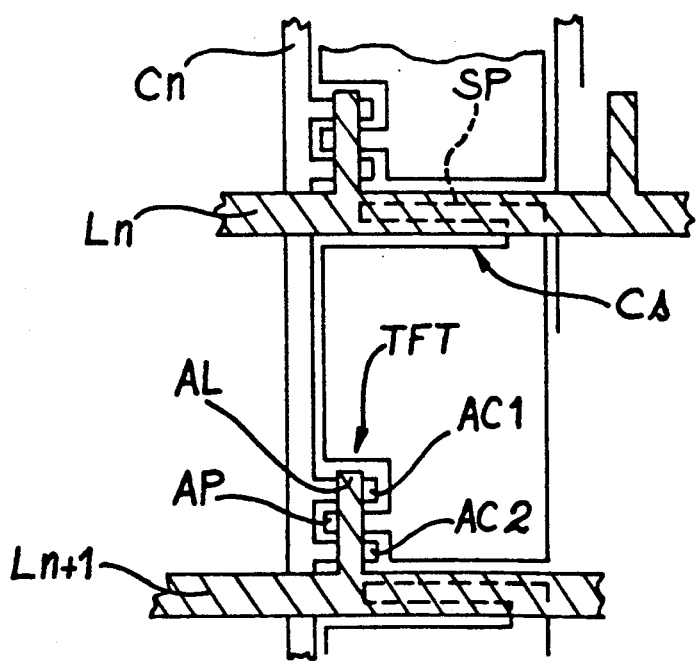
FIG. 13 shows the final variant of the screen of the invention.

In all these variants, the storage capacitors are obtained by lines specially allocated for this function, the lines being added to the addressing lines. In another embodiment, it is these the addressing lines which fulfill this function. FIGS. 11 to 13 show this embodiment.

In FIG. 11, each block P is extended by a lengthening piece AP forming a double transistor with the line Ln+1 and by a segment SP passing under the preceding line Ln.

FIG. 12 shows the section along a line Ln. This shows on the substrate 10 the conductive film 12 forming the column and its lengthening piece, the block and its lengthening piece and the upper segment of the adjacent block, the semiconductive film 14, the nonconducting film 16, and the conductive film 18 forming the line Ln.

FIG. 13 shows a double transistor variant obtained by two column lengthening pieces AC1, AC2, a block lengthening piece AP and a line lengthening piece AL, the storage capacitor being obtained by a segment SP extending the block and disposed under the preceding line Ln.

In all these examples, the storage capacitor results from a conductive line overlapping a conductive block, the separation between these conductive zones being obtained by the semiconductive film (14) and the nonconducting film (16).

The value of such a capacitor may be calculated by taking, as regards length, the step P of the pixels and, as regards width, the width W of a line. Then the following is obtained:

$$Cs = \epsilon_o \epsilon_r \frac{P \cdot W}{d}$$

where d is the thickness of the films separating the armatures, $\epsilon_r$ the dielectric constant of these films and $\epsilon_o$ the dielectric constant of the vacuum.

In practice, one roughly has the following:
p = 250 μm
W = 20 μm
$\epsilon_r$ = 7
d = 0.3 μm
$\epsilon_o$ = 1/36 , 10 which, for Cs, gives a value of $1.03 \cdot 10^{-12}$, namely about 1 pF.

This value is to be compared with the capacity of the pixel which, for a step of 250 μm and a liquid crystal thickness of 5 μm, is about 0.5 pF.

The capacitors formed in accordance with the invention thus have a capacity exceeding or roughly exceeding the capacity of the pixel, which is clearly the sought-after objective.

What is claimed is:

1. A method of manufacturing a display screen comprising the steps of:
   depositing a film of transparent conductive material on a nonconducting substrate;
   etching, by a first etching through a first masking level, said film of transparent conductive material to leave portions thereof forming addressing columns and a matrix of blocks, each block being extended by at least a first lengthening piece situated close to an addressing column;
   successively depositing a stack of films of semiconductive, nonconducting and conductive materials;
   etching, by a second etching through a second masking level, said stack of films to leave portions thereof forming addressing lines, overlapping said addressing columns, as well as said block lengthening pieces, so as to form addressing thin film transistors, and forming capacitive lines disposed parallel to said addressing lines and overlapping one portion of said blocks, each capacitive line forming, along with the portion of the block it overlaps, a storage capacitor associated with the block it overlaps.

2. The method according to claim 1, wherein in said first etching step, said first etching leaves blocks which are extended by a segment, said capacitive lines obtained in second etching step by said second etching overlapping said segments and, with each of these segments, forming said storage capacitor.

3. A method according to claim 1, wherein in said first etching step said first etching leaves addressing columns provided with column lengthening pieces.

4. The method according to claim 1, wherein in said second etching step, said second etching leaves addressing lines which are provided with line lengthening pieces, said line lengthening pieces overlapping said addressing columns.

5. The method according to claim 1, wherein in said first etching step, said first etching leaves addressing columns provided with column lengthening pieces and wherein in said second etching step said second etching leaves addressing lines which are provided with line lengthening pieces, said line lengthening pieces overlapping said column lengthening pieces.

6. The method according to claim 1, wherein in said first etching step, said first etching leaves blocks which are provided with a second block lengthening piece, said second block lengthening piece being situated under a next addressing line, each block thus being controlled by two consecutive addressing lines through a first addressing transistor and through a second addressing transistor, and in said second etching step said second etching leaves said capacitive lines which overlap said blocks in their median section between said two successive addressing lines.

7. The method according to any one of claims 1-6, wherein in said second etching step, said second etching leaves a portion forming a strip on a side of the display screen, said strip being connected to all of said capacitive lines.

8. The method according to claim 2, wherein in said second etching step, said second etching leaves said capacitive lines merging with said addressing lines and overlapping said block segments for forming said storage capacitors, and said columns and block lengthening pieces for forming said addressing thin film transistors.

* * * * *